United States Patent [19]

Hodges, Jr. et al.

[11] 4,223,467
[45] Sep. 23, 1980

[54] VIBRATING FISHING LURE

[76] Inventors: Jesse L. Hodges, Jr., Rt. 1, Box 215, Elm Groove, La. 71051; Ivan J. Edwards, 1200 Holiday Pl., Bossier City, both of La. 71112

[21] Appl. No.: 945,469

[22] Filed: Sep. 25, 1978

[51] Int. Cl.³ .............................................. A01K 85/00
[52] U.S. Cl. .................................................... 43/42.31
[58] Field of Search .............................. 43/17.1, 42.31

[56] References Cited

U.S. PATENT DOCUMENTS

| | | | |
|---|---|---|---|
| 2,784,399 | 3/1957 | Smith | 43/42.31 X |
| 2,920,318 | 1/1960 | Baleken | 43/42.31 |
| 3,120,073 | 2/1964 | Brunton | 43/17.1 |
| 3,310,902 | 3/1967 | Godby | 43/17.1 |
| 3,416,254 | 12/1968 | Bornzin | 43/17.1 |

Primary Examiner—Harold D. Whitehead

[57] ABSTRACT

A vibrating fishing lure which includes a hollow body carrying at least one set of hooks and a coil and breaker point vibrator combination mounted in the hollow interior of the body, which vibrator is activated by an attitude sensitive switch and is powered by a battery. The battery is removably positioned in a cylindrically shaped carrier and sleeve located inside the hollow body with access to the battery provided by a water tight threaded cap.

2 Claims, 10 Drawing Figures

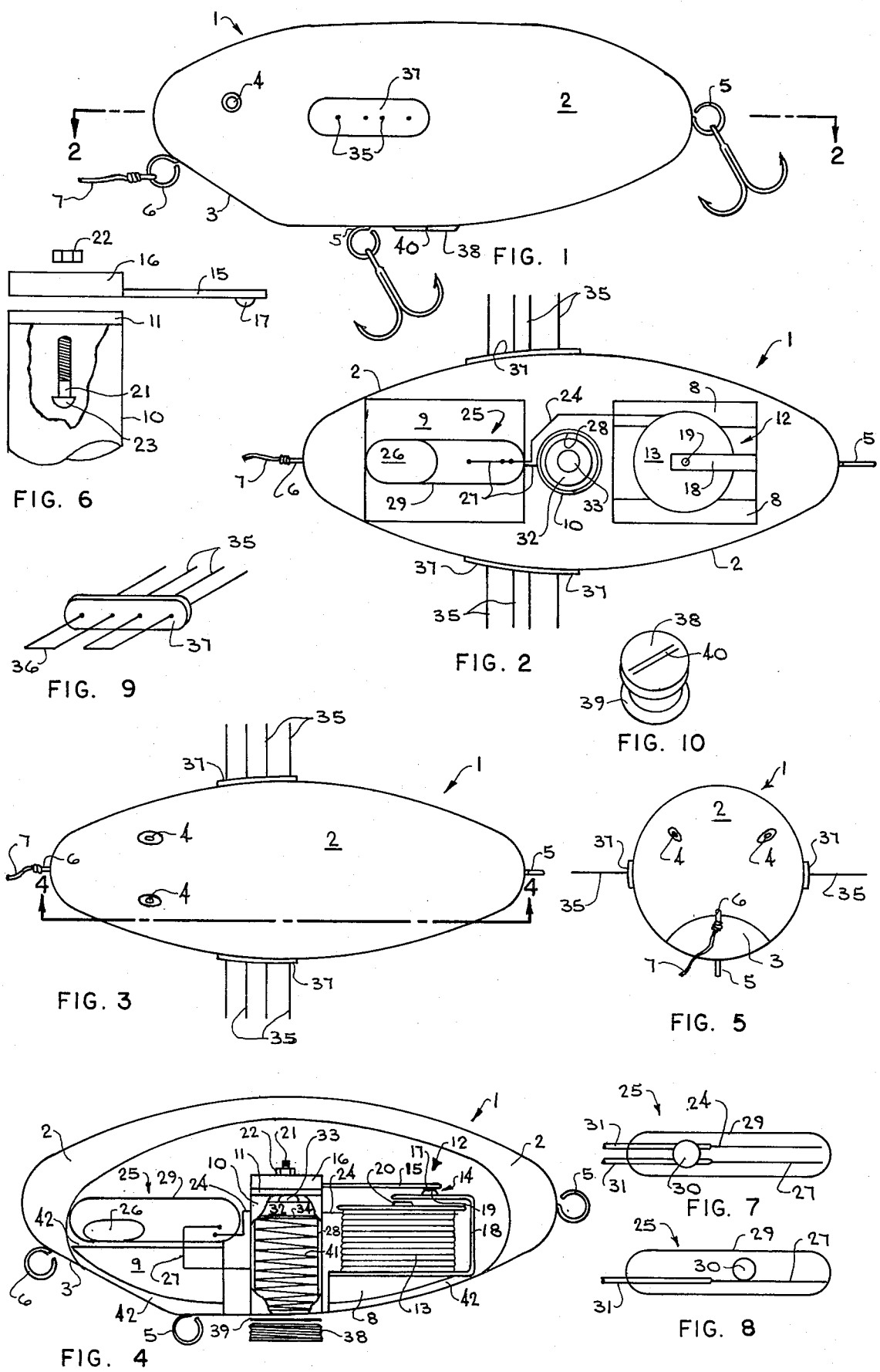

VIBRATING FISHING LURE

BACKGROUND OF THE INVENTION

1. Field of the Invention

This invention relates to fishing lures, and more particularly to a variation of the popular "plug" type floating fishing lures, and is characterized by internally mounted and externally aided buzzing or vibrating means powered by a battery and intermittently activated by an attitude sensitive switch such as a mercury switch. The lure of this invention is retrieved in short pulls or jerks which alter the attitude of the lure on the surface of the water and effect an intermittent vibration or buzzing which attracts fish. The lure carries a replaceable battery in the hollow body cavity and is fitted with several projecting fingers which vibrate at the water line upon activation of the internal buzzing or vibrating mechanism to further enhance attraction of the fish.

2. Description of the Prior Art

Plug-type lures having internal eccentric, vibrating or buzzing means for producing noise and lure vibration are known in the art. Typical of these lures is the Eccentric Motion Fishing Lure described in U.S. Pat. No. 3,841,012 to Christopher T. Maled, which includes a lure characterized by a hollow body which is caused to vibrate by a rotor, motor and battery combination located inside the body cavity. The battery is wired to the motor and drives an eccentrically mounted weight on the motor output shaft, which weight rotates and strikes the inside cavity of the body to produce vibration, motion, and sound. Another similar lure of the plug design is the Sonic Fishing Lure described in U.S. Pat. No. 3,310,902 to J. H. Godby, which lure includes a vibrating coil and breaker point system which are energized by a battery and activated by a switch means operated by tension applied to the connecting line. Buzzing or vibrating of the internal coil and breaker point system is accomplished by pulling or jerking the line to slidably displace the switch with respect to the lure body, and thus complete the electrical circuit.

One of the problems associated with prior art fishing lures characterized by internal vibration-producing mechanisms is the relatively complex design of such mechanisms. Lures of this design must be strong, and the internal working parts well mounted and simple in design in order to withstand violent strikes by fish and inadvertent casts against trees, stumps, rocks and the like. Accordingly, any projecting part of the noise and vibration means is susceptible of being bent or broken, and the vibration-producing mechanism thereby rendered inoperative. Furthermore, in complex vibration producing systems, the internal wiring sometimes breaks loose from soldered or wrapped contacts to render the vibration device inoperative.

Accordingly, it is an object of this invention to provide a new and improved vibrating fishing lure which is simple in design, has few moving parts and is characterized by a simple, yet effective wiring system.

Another object of the invention is to provide a vibrating fishing lure which is characterized by a strong wiring system and a vibrator and attitude responsive switch which are cushion mounted in the hollow interior of the lure to reduce the likelihood of damage due to contact with obstacles during casting and shock from the action of striking fish.

It is another object of the invention to provide a new vibration-producing, surface operated fishing lure which is characterized by a simple but reliable vibrator and attitude sensitive switch, and attitude responsive design, which vibrator is energized by a small battery.

Yet another object of the invention is to provide a new and improved internal and external vibrating fishing lure which includes an internal vibrator or buzzer in electrical cooperation with a battery and an attitude-responsive switch, as well as external vibrating fingers which help to transmit vibration from the lure body to the supporting and surrounding water.

A still further object of the invention is to provide a surface lure of the "plug" type which is designed to float freely in essentially horizontal posture on the surface of the water, and which is further characterized by an internal vibration-producing mechanism in electrical cooperation with an energizing battery and a generally horizontally mounted attitude sensitive switch which completes the vibration-producing circuit when the forward end of the lure is raised responsive to tension on a line tied to the lure.

Another object of the invention is to provide a new and improved floating vibrating fishing lure which is characterized by a hollow body and at least one hook attached to the body, and a battery operated vibration-producing circuit and vibrating means inside the body cavity, and further including a battery capsule having a water-tight cap removably cooperating therewith to facilitate replacement of the battery.

SUMMARY OF THE INVENTION

A vibrating fishing lure characterized by a shaped outer shell having a hollow interior, with a vibrating means located inside the hollow cavity and energized by a removable battery, and further including vibrating fingers extending from the lure body at the water line. Selective energizing of the vibrating mechanism is achieved by means of a generally horizontally mounted attitude sensitive switch, such as a mercury switch or the like, and the positioning of the lure and switch into activation configuration by an upward lifting of the front of the lure responsive to retrieval of the lure by a line attached thereto. The vibrator and switch are cushion mounted in the lure cavity and access to the removable battery is provided by a threaded cap which is made water tight by the provision of a rubber or neoprene grommet or "O" ring.

BRIEF DESCRIPTION OF THE DRAWINGS

The vibrating fishing lure of this invention will be better understood by reference to the accompanying drawings wherein:

FIG. 1 is a side elevation of the vibrating fishing lure of this invention;

FIG. 2 is a top sectional view taken along lines 2—2 in FIG. 1, more particularly illustrating a preferred configuration of the internal working parts of the lure;

FIG. 3 is a top elevation of the vibrating fishing lure illustrated in FIG. 1;

FIG. 4 is a side sectional view taken along lines 4—4 of the vibrating fishing lure illustrated in FIG. 3, and further illustrating a preferred configuration of the internal working parts of the lure;

FIG. 5 is a front elevation of the fishing lure illustrated in FIG. 1;

FIG. 6 is a side elevation, partially in section, of a preferred battery capsule or case and point mount system of the lure of this invention;

FIG. 7 is a top elevation of an alternative preferred switch means which may be used to activate the lure vibrator;

FIG. 8 is a side elevation of the switch means illustrated in FIG. 7;

FIG. 9 is a perspective view of a preferred arrangement of the externally mounted vibrating fingers projecting from the vibrating fishing lure of this invention; and FIG. 10 is a perspective view of a preferred battery cap for removably sealing the battery inside the battery case positioned in the hollow cavity of the lure.

DESCRIPTION OF THE PREFERRED EMBODIMENT

Referring now to FIGS. 1, 3 and 5 of the drawing, the vibrating fishing lure of this invention is generally illustrated by reference numeral 1, and includes a hollow, shaped body or shell 2, which is designed to float as it is retrieved. In a preferred embodiment of the invention the hollow body 2 is formed in two sections, a bottom and a top segment, and is generally ellipsoidal in shape with a bevel 3 provided near the frontal lower segment of body 2 to enhance surface action as the lure is retrieved. Body 2 is further provided with eyes 4, at least one hook support 5, and a line tie 6, to which a retrieving line 7 is securely fastened, as illustrated. As illustrated in FIGS. 3 and 9 of the drawing, a plurality of vibrating fingers 35 are mounted in a facing 37 to extend outwardly of the sides of vibrating fishing lure 1. Vibrating fingers 35 are preferably formed with a shank 36 common to each pair of fingers in order to securely mount the fingers in facing 37, as illustrated in FIG. 9, and serve to help transmit vibration from the interior of body 2 to the water supporting vibrating fishing lure 1 as hereinafter described. In a preferred embodiment of the invention vibrating fingers 35 are positioned on the sides of body 2 forward of the center of the lure body and sufficiently distant from the bottom of the lure to project substantially in the plane of the water line as the lure floats freely in water. Vibration of the fingers so located creates an attraction to fish positioned beneath the lure.

Referring now to FIGS. 2, 4 and 6 of the drawing, a vibrator support 8 and a switch support 9 are provided in front and rear segments, respectively, of the lower half of the hollow interior of body 2, and a battery case 10 is located between vibrator support 8 and switch support 9 in upward standing relationship from the bottom or lower segment of body 2, as illustrated. In a preferred embodiment of the invention both vibrator support 8 and switch support 9 are secured to the bottom interior of body 2 by means of a layer of silicone compound 42, which remains relatively soft and pliable when cured and provides a shock resistant cushion for the supports. Battery case 10 is formed of a non-electrically conducting material and is generally cylindrical in shape and hollow in order to accommodate a battery 32, which is fitted with a projecting positive terminal 33 facing upwardly, as illustrated in FIG. 2. Referring now to FIGS. 4 and 6 of the drawing, and to FIG. 6 specifically, it will be appreciated that battery case 10 is fitted with a metal battery case top 11, to which is fastened a top breaker mount 16, from which the top breaker point 15 of breaker points 14 in a vibrator 12 projects. Vibrator 12 is secured to vibrator support 8, and in a preferred embodiment of the invention, top breaker mount 16, carrying top breaker point 15, is tightly secured to battery case top 11 by means of breaker point bolt 21 with cooperating breaker point nut 22, as shown in FIG. 6. Bolt head 23 serves as an internal contact for positive terminal 33 of battery 32, and top breaker point 15 is fitted with top breaker contact 17, which mates with a bottom breaker contact 19, carried by a cooperating bottom breaker point 18. Bottom breaker point 18 is in turn mounted on coil 13, which is fitted with a coil contact 20 to complete the assembly of vibrator 12. It will be understood by those skilled in the art that the combination of top breaker point 15, bottom breaker point 18 and coil 13 effects the buzzing and vibrating function of vibrator 12 which is critical to the invention, under circumstances which will be outlined hereinafter.

Attitude sensitive switch 25, illustrated in FIGS. 2 and 4 of the drawing, is characterized by a switch housing or ampoule 29 (typically formed of glass) secured to switch support 9 by a cushion of silicone compound 42, and in a preferred embodiment, contains a quantity of mercury 26 to serve as the switching medium. One end of a pair of electrically conducting elements, coil lead 24 and battery lead 27, project through the walls of switch housing 29 and are disposed in spaced relationship inside switch housing 29. The opposite end of coil lead 24 is in electrical contact with coil 13, while the opposite end of battery lead 27 projects through the wall of battery case 10 and communicates with case sleeve 28. Battery spring 41 is, in turn, in contact with both case sleeve 28 and the negative terminal 34 of battery 32. Attitude sensitive switch 25 is securely mounted on switch support 9 inside body 2 with the forward end facing bevel 3 at a slightly lower elevation than the opposite end in order to facilitate initial confinement of the mass of mercury 26 in the forward end of switch housing 29 when vibrating fishing lure 1 floats freely in essentially horizontal configuration in the water. It will be appreciated that case sleeve 28 extends no further from the bottom of the non-conducting battery case 10 upwardly into battery case 10 than the midpoint of battery 32 in order to insure that case sleeve 28 will not contact battery case top 11 and cause a short circuit.

Referring again to FIGS. 2 and 4 of the drawing, relative to the electrical wiring of vibrating fishing lure 1, vibrator 12 is characterized by the combination of coil 13, breaker points 14, and coil contact 20. Top breaker point 15 is in contact with the positive terminal 33 of battery 32 through top breaker point mount 16. Furthermore, as noted above, the negative terminal 34 of battery 32 communicates with attitude sensitive switch 25 by means of battery lead 27, which projects into battery case 10 and joins case sleeve 28, and is in contact with negative terminal 34 by the action of battery spring 41 and case sleeve 28. Also, coil 13 is in communication with attitude sensitive switch 25 by means of coil lead 24, and when the mass of mercury 26 flows to the opposite or rear end of switch housing 29 and completes the circuit between battery lead 27 and coil lead 24, current is permitted to flow through coil 13 and breaker point 14, which causes top breaker point 15 and bottom breaker point 18 to vibrate, thereby effecting the buzzing noise desired.

In operation, the vibrating fishing lure 1 of this invention may be operated as follows: The battery cap 38 and battery cap seal 39 illustrated in FIGS. 4 and 10 are removed from a threaded position in the lower segment of battery case 10 by inserting a coin or screwdriver blade into slot 40. Battery spring 41 is then removed from the interior of battery case 10 and a battery 32 inserted inside case sleeve 28 and battery case 10 with positive terminal 33 facing up. Battery spring 41, battery cap seal 39 and battery cap 38 are then replaced as illustrated in FIG. 4. A conventional line 7, carried by a rod and reel, is then tied to line tie 6, and vibrating fishing lure 1 is cast into the water in conventional fashion. The lure may then be allowed to rest freely in the water, floating in substantially horizontal position, as illustrated in FIG. 1 of the drawing, or it may be retrieved rapidly immediately upon striking the water to simulate a wounded or frightened minnow or shad. Application of tension on line 7 by activation of the rod tip and accumulation of line on the reel spool causes the front end of vibrating fishing lure 1 to move upwardly, thereby displacing the mass of mercury 26 from the forward end of switch housing 29 of attitude sensitive switch 25 to the rear and now lower end of the housing, thus completing the circuit between coil lead 24 and battery lead 27 by electrical conduction energized by battery 32. This configuration of vibrating fishing lure 1 causes a vibration or buzzing to occur as vibrator 12 is energized, and the buzzing continues until the lure is again permitted to settle in the water in a horizontal position where the mercury 26 again flows to the forward end of attitude sensitive switch 25. Accordingly, by alternately moving the front end of the lure upwardly and then permitting it to again settle in the water by manipulation of the rod and reel, the fisherman can control both the duration and sequence of vibration in vibrating fishing lure 1 to suit the prevailing fishing conditions.

In another preferred embodiment of the invention an alternative switch means for selectively causing vibrating fishing lure 1 to vibrate or buzz is provided as illustrated in FIGS. 7 and 8 of the drawing. As in the case of the mercury filled ampoule shown in FIGS. 2 and 4, the alternative attitude sensitive switch 25 may also be characterized by a similar switch housing 29, preferably formed of glass or a clear plastic, with a pair of conductors, coil lead 24 and battery lead 27, communicating with the interior of the housing, and a steel ball 30 positioned on the leads. However, in this embodiment of the invention, both coil lead 24 and battery lead 27 are provided with insulation 31 at the points of entry into switch housing 29 and coextensive with the run of the leads for about one-half of the extended distance of coil lead 24 and battery lead 27 inside switch housing 29. Accordingly, when vibrating fishing lure 1 is floating freely on the surface of a lake or pond in essentially horizontal relationship, the slightly downward tilt of switch housing 29 to the front of the lure keeps steel ball 30 near the forward end of switch housing 29 and supported on insulation 31 covering coil lead 24 and battery lead 27, as illustrated in FIG. 7. When the body 2 of vibrating fishing lure 1 is tilted by rod action with the head in elevated configuration, ball 30 rolls to the rear of switch housing 29 and completes the circuit between coil lead 24 and battery lead 27 to activate vibrator 12. When the body 2 resumes its horizontal posture the ball again rolls onto the insulation 31 and breaks the circuit, thus silencing vibrator 12.

It will be appreciated by those skilled in the art that activation of vibrator 12 according to the teachings of this invention effects vibration or buzzing of vibrator support 8, and the entire body 2 of vibrating fishing lure 1. This internal vibration is also transmitted through body 2 to vibrating fingers 35 to more efficiently transmit the vibration to the water supporting and surrounding the lure in order to more effectively attract fish. While vibrating fingers 35 can be manufactured of plastic, fiberglass and other non-metallic material, in a preferred embodiment of the invention the fingers are formed of thin, flexible metal strands, generally no longer than about an inch each. However, the number, diameter and length of vibrating fingers 35 can be varied in order to vary the degree of vibration transmitted to the water surrounding vibrating fishing lure 1.

Having described my invention with the particularity set forth above, what is claimed is:

1. A vibrating fishing lure comprising:
   (a) a hollow body;
   (b) a battery in the cavity of said hollow body;
   (c) vibrating means in said cavity of said hollow body and in electrical cooperation with said battery;
   (d) attitude sensitive switch means in said cavity of said hollow body and in electrical cooperation with said battery and said vibrating means for selectively energizing said vibrating means responsive to tensioning of a fishing line connected to said body;
   (e) a plurality of thin, flexible, outwardly extending finger means projecting from said body and vibrating with said vibrating means to disturb the water supporting and surrounding said lure; and
   (f) eye means carried by said hollow body for attaching said line and at least one hook to said lure.

2. A floating, vibrating fishing lure comprising:
   (a) a hollow body;
   (b) a plurality of thin, flexible wire finger means projecting outwardly in pairs from the side of said body, each of said pairs having a common shank in contact with said body;
   (c) a battery capsule extending upwardly from the interior bottom center of said hollow body in essentially vertical relationship;
   (d) a battery inside said capsule;
   (e) cap means cooperating with the bottom of said capsule to removably seal said battery inside said capsule;
   (f) a coil and breaker point vibrating means inside said hollow body and in electrical cooperation with said battery; and
   (g) attitude sensitive switch means inside said hollow body and also in electrical cooperation with said battery and said vibrating means for facilitating the energizing of said vibrating means responsive to the attitude of said lure in the water; and
   (h) eye means carried by said hollow body for attaching a line and at least one hook to said lure.

* * * * *